US008988820B1

(12) United States Patent
Tashiro

(10) Patent No.: US 8,988,820 B1
(45) Date of Patent: Mar. 24, 2015

(54) ROTATING DEVICE

(71) Applicant: Samsung Electro-Mechanics Japan Advanced Tech. Co. Ltd., Fujieda, Shizuoka Prefecture (JP)

(72) Inventor: Tomoyuki Tashiro, Fujieda (JP)

(73) Assignee: Samsung Electro-Mechanics Japan Advanced Technology Co., Ltd., Fujieda, Shizuoka Prefecture (JP)

( * ) Notice: Subject to any disclaimer, the term of this patent is extended or adjusted under 35 U.S.C. 154(b) by 0 days.

(21) Appl. No.: 14/546,880

(22) Filed: Nov. 18, 2014

(30) Foreign Application Priority Data

Nov. 19, 2013 (JP) .................... 2013-239183

(51) Int. Cl.
*G11B 17/02* (2006.01)
*H02K 11/00* (2006.01)

(52) U.S. Cl.
USPC ....................................................... 360/99.08

(58) Field of Classification Search
CPC ........... G11B 19/2009; G11B 19/2045; H02K 1/146; H02K 3/522; H02K 5/225; H02K 11/00
See application file for complete search history.

(56) References Cited

U.S. PATENT DOCUMENTS

| | | | | |
|---|---|---|---|---|
| 6,043,583 | A * | 3/2000 | Kurosawa et al. | 310/254.1 |
| 2002/0117909 | A1 * | 8/2002 | Gomyo | 310/67 R |
| 2006/0290228 | A1 * | 12/2006 | Fujita et al. | 310/208 |
| 2010/0231068 | A1 * | 9/2010 | Yamazaki et al. | 310/71 |
| 2012/0200957 | A1 * | 8/2012 | Yawata | 360/99.08 |
| 2012/0212092 | A1 | 8/2012 | Goto et al. | |
| 2013/0050872 | A1 * | 2/2013 | Sekii et al. | 360/99.08 |
| 2013/0050873 | A1 * | 2/2013 | Abe et al. | 360/99.08 |
| 2013/0214637 | A1 * | 8/2013 | Hill et al. | 310/216.041 |
| 2013/0229727 | A1 | 9/2013 | Saeki et al. | |
| 2013/0301161 | A1 * | 11/2013 | Saeki | 360/99.08 |

FOREIGN PATENT DOCUMENTS

JP 2012172781 A 9/2012

* cited by examiner

*Primary Examiner* — Angel Castro
(74) *Attorney, Agent, or Firm* — Holtz, Holtz, Goodman & Chick PC

(57) ABSTRACT

A rotating device includes a hub on which a magnetic recording disk is to be mounted, a base supporting the hub in a freely rotatable manner through a fluid dynamic bearing, a stator core which is fixed to the base, and which includes an annular portion and multiple salient poles extending therefrom, coils wound around the respective salient poles, and a flexible printed board transmitting electrical power to the coils. A drawn wire of the coil is electrically connected with the flexible printed board at a connection position avoiding a location right below the coil where the drawn wire is drawn.

20 Claims, 10 Drawing Sheets

100

ROTATING DEVICE

BACKGROUND OF THE INVENTION

1. Field of the Invention

The Embodiment of the present disclosure relates to a rotating device including coils.

2. Description of the Related Art

Example rotating devices known are disk drive devices like a hard disk drive. Downsizing, thinning, and weight saving are advancing for disk drive devices, and such disk drive devices are now built in various electronic devices. In particular, disk drive devices are often built in portable electronic devices, such as a laptop computer and a digital video camera. For example, JP 2012-172781 A discloses a conventional disk drive device.

Improvements of the shock resistance and the vibration resistance are necessary for disk drive devices built in portable electronic devices in comparison with ones built in stationary electronic devices so as to withstand against shock due to, for example, falling, and vibration at the time of carriage.

Recent advancements of downsizing, thinning, and weight saving of portable electronic devices are remarkable, and thus further downsizing, thinning, and weight saving are necessary for disk drive devices. In order to advance the downsizing, thinning and weight saving of disk drive devices, for example, a base may be made thin. In addition, a distance between a base and a stator core may be reduced. When, however, the base is made thin or the distance between the base and the stator core is reduced, the shock resistance and vibration resistance of disk drive devices may be deteriorated.

The present disclosure has been made in view of the aforementioned circumstances, and it is an objective of the present disclosure to provide a rotating device that enables downsizing, thinning and weight saving while suppressing a deterioration of the shock resistance and the vibration resistance.

SUMMARY OF THE INVENTION

To accomplish the above objective, a rotating device according to an aspect of the present disclosure includes: a hub including a mount portion on which a recording disk is to be mounted; a base including a sheet-metal bottom formed of an aluminum plate or a steel plate, and supporting the hub in a freely rotatable manner through a fluid dynamic bearing; a core fixedly supported by the sheet-metal bottom, and including an annular portion and a plurality of salient poles extending from the annular portion; coils wound around the plurality of salient poles, respectively; and a wiring structure transmitting electric power to the coils, in which: the wiring structure includes a wiring substrate fixed to the sheet-metal bottom, and a drawn wire from the coil electrically connected with a connection portion of the wiring substrate; and the connection portion is provided at a location distant from the coil in a circumferential direction, and the drawn wire includes a loosen portion in an axial direction and in the circumferential direction so as to have a play.

To accomplish the above objective, a rotating device according to another aspect of the present disclosure includes: a hub including a mount portion on which a recording disk is to be mounted; a base including a sheet-metal bottom formed of an aluminum plate or a steel plate, and supporting the hub in a freely rotatable manner through a fluid dynamic bearing; a core fixedly supported by the sheet-metal bottom, and including an annular portion and a plurality of salient poles extending from the annular portion; coils wound around the plurality of salient poles, respectively; and a wiring structure transmitting electric power to the coils, in which: the wiring structure includes a wiring substrate fixed to the sheet-metal bottom, and a drawn wire from the coil electrically connected with a connection portion of the wiring substrate, the connection portion being provided at a location distant from the coil in a circumferential direction; and the wiring substrate includes: a first portion fixed on a surface of the sheet-metal bottom at the core side, and provided with the connection portion; and a second portion taken out through an opening of the sheet-metal bottom; and the first portion and the second portion are formed integrally with each other.

Any arbitrary combination of the aforementioned components, and mutual replacements of the components and expressions of the present disclosure among a method, an apparatus, and a system, etc., are also effective as a form of the present disclosure.

DETAILED DESCRIPTION OF THE PREFERRED EMBODIMENTS

Figure 1A:
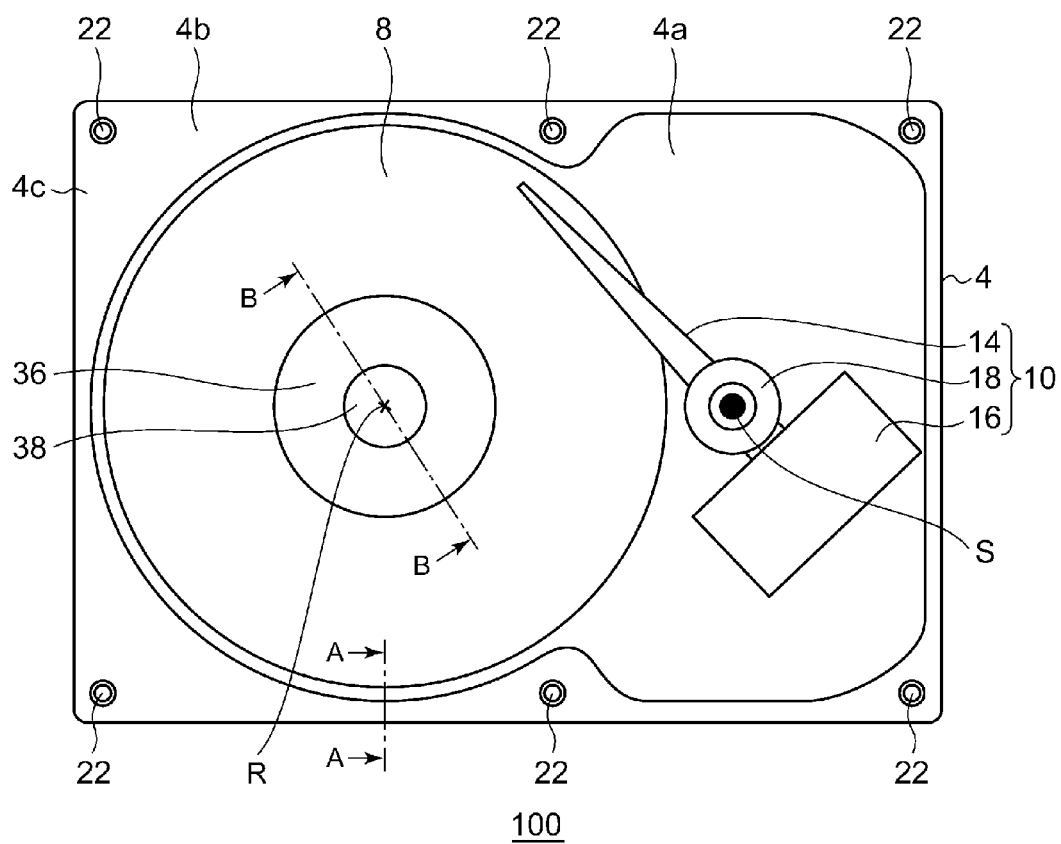
FIG. 1A is a top view illustrating a rotating device according to a first embodiment.

Embodiments of the present disclosure will be explained below with reference to the accompanying drawings.

In the following explanation, the same or equivalent structural element or member illustrated in respective drawings will be denoted by the same reference numeral, and the duplicated explanation thereof will be omitted. In addition, the dimension of a member in each drawing will be enlarged or scaled-down to facilitate understanding to the present disclosure. Still further, a part of a member not important to explain the embodiment in each drawing will be omitted.

A rotating device according to an embodiment is suitably utilized as a disk drive device, in particular, a hard disk drive on which a magnetic recording disk is to be mounted and which rotates and drives the mounted magnetic recording disk.

First, a background to reach the present disclosure of this embodiment will be explained.

Further downsizing, thinning and weight saving are required for rotating devices like disk drive devices. In order to accomplish downsizing, thinning and weight saving of a rotating device, for example, a base may be made thin. As an example, a base including an embossed portion formed by pressing a thin metal sheet is applicable. In addition, a distance between the base and a stator core may be reduced. When, however, the base is made thin or the distance between the base and the stator core is reduced, a wire wound around the stator core may breaks due to shock and vibration, and thus the rotating device becomes defective.

The inventor of the present disclosure found that, in the case of, for example, a rotating device with the following features:

(1) a base includes an embossed portion formed by pressing a thin metal sheet;

(2) a stator core around which coils are wound is fixed to the embossed portion; and (3) the drawn wire of the coil is drawn to the lower face side of the base at a position closer to the rotation axis of a hub relative to the outer circumference of the stator core, when a shock of 1200 G is applied to such a rotating device, the base is deformed, and the minimum distance between the stator core and the base is changed over 0.1 mm. When the base is deformed in a direction in which the distance from the stator core increases, excessive stress is applied to the wire in a tensile direction. When this stress is repeatedly applied to the wire, the wire breaks because of metal fatigue. That is, when the base is made thin, the base is likely to be deformed, and the wire is likely to break because of such a deformation. Based on the above-explained studies, the inventor of the present disclosure got to accomplish the present disclosure.

Figure 1B:
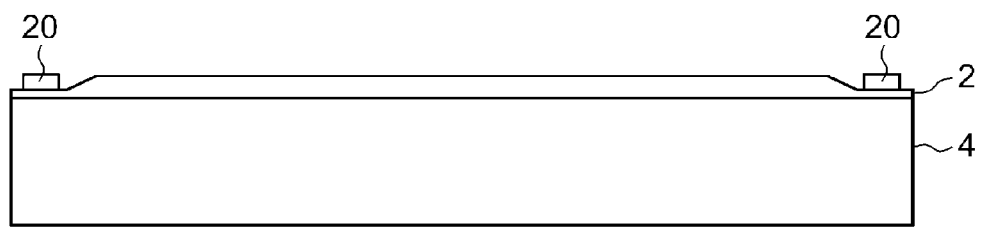
FIG. 1B is a side view illustrating the rotating device of the first embodiment.

FIGS. 1A and 1B illustrate a rotating device 100 of a first embodiment. FIG. 1A is a top view of the rotating device 100. FIG. 1B is a side view thereof. In FIG. 1A, in order to show the internal structure of the rotating device 100, the condition in which a top cover 2 is detached. The rotating device 100 includes a stationary body, a rotating body that rotates relative to the stationary body, a magnetic recording disk 8 to be attached to the rotating body, and a data reader/writer 10. The stationary body includes a base 4, the top cover 2, and six screws 20. The rotating body includes a clamper 36 and a disk fixing screw 38.

In the following explanation, a side at which the rotating body is mounted relative to the base 4 will be defined as an upper side.

The magnetic recording disk 8 is, for example, a 2.5-inch magnetic recording disk formed of glass, and having a diameter of 65 mm. The diameter of a center hole is 20 mm, and the thickness is 0.65 mm. The magnetic recording disk 8 is to be mounted on the hub 28 (unillustrated in FIGS. 1A), and is rotated together with a rotation of the hub 28. The clamper 38 is pressed against the upper face of the hub 28 by the disk fixing screw 38, and pushes the magnetic recording disk 8 against a disk mount face of the hub 28.

The base 4 is formed by, for example, pressing a steel sheet or an aluminum plate. The base 4 includes a bottom portion 4a forming the bottom of the rotating device 100, and an outer circumference wall 4b formed along the outer circumference of the bottom portion 4a so as to encircle an area where the magnetic recording disk 8 is to be placed. Six screw holes 22 are provided in an upper face 4c of the outer circumference wall 4b. The base 4 may be formed and shaped by die-casting of an aluminum alloy.

Figure 2:
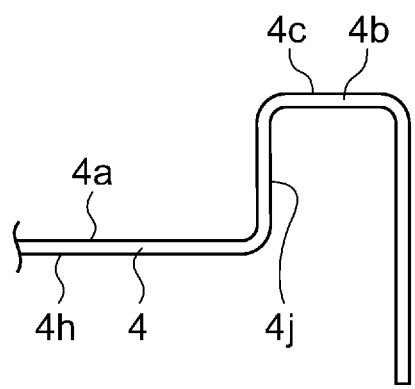
FIG. 2 is a cross-sectional view taken along a line A-A in FIG. 1A.

FIG. 2 is a cross-sectional view taken along a line A-A in FIG. 1A. In FIG. 2, the illustration of the magnetic recording disk 8 is omitted. As illustrated in FIG. 2, the outer circumference wall 4b employs a fold-back structure. In other words, the outer circumference wall 4b includes a circular recess 4j having a lower face 4h concaved upwardly.

Returning to FIGS. 1A and 1B, the data reader/writer 10 includes an unillustrated recording/playing head, a swing arm 14, a voice coil motor 16, and a pivot assembly 18. The recoding/playing head is attached to the tip of the swing arm 14, records data in the magnetic recording disk 8, or reads the data therefrom. The pivot assembly 18 supports the swing arm 14 in a swingable manner to the base 4 around a head rotating axis S. The voice coil motor 16 allows the swing arm 14 to swing around the head rotating axis S to move the recording/playing head to a desired location over the top face of the magnetic recording disk 8. The voice coil motor 16 and the pivot assembly 18 are configured by a conventionally well-known technology of controlling the position of a head.

The top cover 2 is fastened to the upper face 4c of the outer circumference wall 4b of the base 4 using six screws 20. The six screws 20 correspond to the respective six screw holes 22. In particular, the top cover 2 and the upper face 4c of the outer circumference wall 4b are fastened together in such a way that no leak to the interior of the rotating device 100 occurs from the joined portion therebetween.

Figure 3:
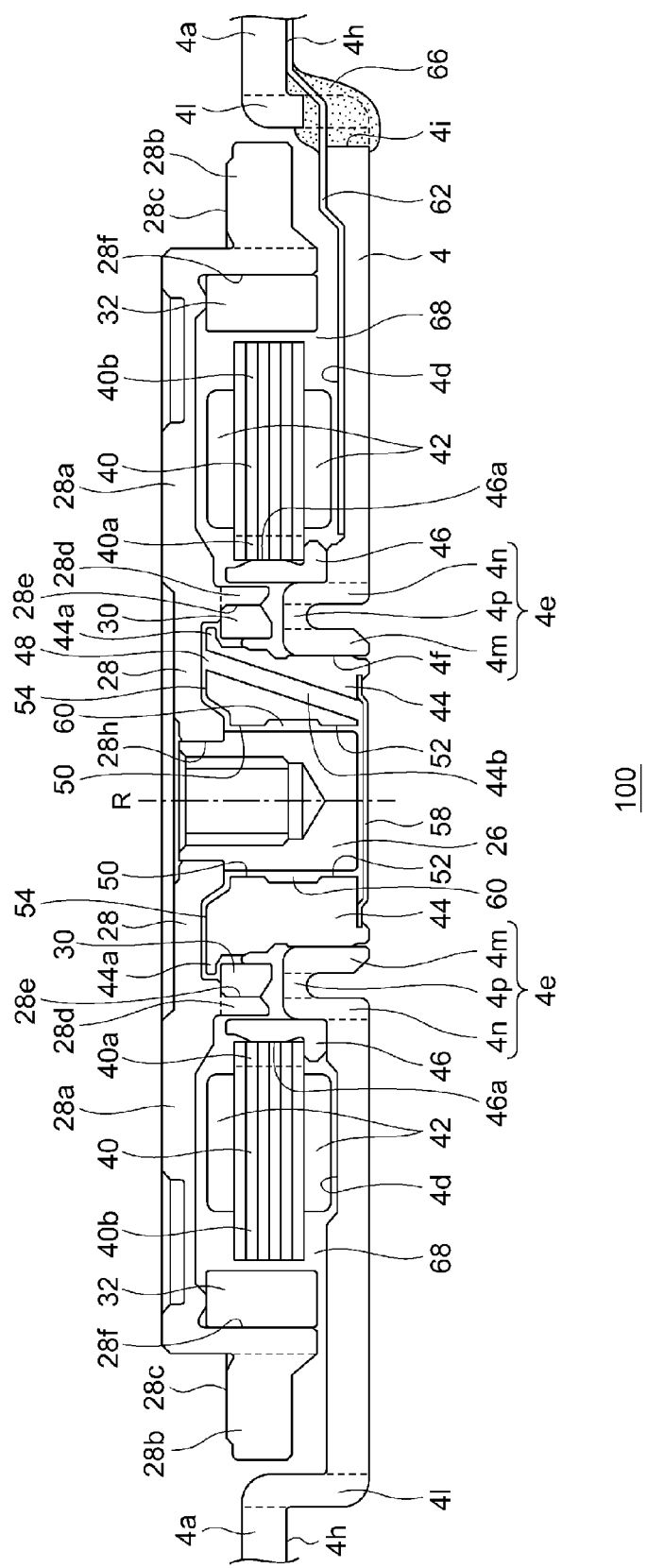
FIG. 3 is a cross-sectional view taken along a line B-B in FIG. 1A.

FIG. 3 is a cross-sectional view taken along a line B-B in FIG. 1A. In FIG. 3, the illustrations of the magnetic recording disk 8, the clamper 36, and the disk fixing screw 38 are omitted. The rotating body further includes a shaft 26, a thrust member 30, and a cylindrical magnet 32. The stationary body further includes a stator core 40, coils 42, a sleeve 44, and a core holder 46. A lubricant 48 is continuously applied in some gaps between the rotating body and the stationary body.

The hub 28 is formed by, for example, cutting and machining or pressing a ferrous material with a soft magnetism like SUS 430, and is formed in a predetermined shape like a substantially cup shape. In order to suppress a peeling from the surface of the hub 28, a surface layer forming process like electroless nickel plating may be applied to the surface of the hub 28.

The hub 28 includes a hub protrusion 28a to be engaged with the center hole of the magnetic recording disk 8, a mount portion 28b provided outwardly in the radial direction (i.e., the direction orthogonal to a rotation axis R) relative to the hub protrusion 28a, and a downward projection 28d protruding downwardly from the lower face of the hub protrusion 28a and encircling the sleeve 44. The magnetic recording disk 8 is to be mounted on a disk mount face 28c that is the upper face of the mount portion 28b.

The hub protrusion 28a is provided with a shaft hole 28h along the rotation axis R. The upper end portion of the shaft 26 is fixed to the shaft hole 28h by a combination of press-fitting and bonding. That is, the circumferential surface of the shaft hole 28h is a contact part between the shaft 26 and the hub 28. The shaft 26 is formed of a harder ferrous material than the material of the hub 28, such as SUS 420 J2.

The thrust member 30 is formed in an annular shape. The thrust member 30 is fixed to an inner circumference 28e of the downward projection 28d of the hub 28 by bonding.

The cylindrical magnet 32 is bonded and fixed to a cylindrical inner circumference 28f of the hub 28 corresponding to the inward cylindrical face thereof. The cylindrical magnet 32 is formed of a rare-earth material, such as neodymium, iron, or boron, and faces nine salient poles 40b of the stator core 40. Driving magnetization with 12 polarities is applied to the cylindrical magnet 32 in a circumferential direction thereof (a tangent line direction of a circle around the rotation axis R and orthogonal thereto). A surface layer is formed on the surface of the cylindrical magnet 32 by electrodeposition coating or spray painting. The surface layer suppresses, for example, a peeling from the surface of the cylindrical magnet 32, and a corrosion thereof.

The stator core 40 includes an annular portion 40a and the nine salient poles 40b extending therefrom outwardly in the radial direction, and is fixed to the upper-face-4d side of the base 4. The stator core 40 can be formed by laminating two to 32 thin magnetic steel sheets each having a thickness within a range between 0.1 to 0.8 mm. In this embodiment, the stator core 40 is formed by laminating six thin magnetic steel sheets each having a thickness of 0.35 mm and integrating those together by caulking. An insulation coating by electrodeposition coating or powder coating is formed on the surface of the stator core 40. The coil 42 is wound around each salient pole 40b of the stator core 40. When three-phase substantially sinusoidal drive currents are caused to flow through the respective coils 42, drive magnetic fluxes are produced along the respective salient poles 40b. Note that the stator core 40 may be formed by solidifying powder materials with magnetism like a sintered body.

The coil 42 is formed by winding a wire around the salient pole 40b of the stator core 40 by the necessary number of turns. The wire is first wound around an arbitrary salient pole 40b from the lower side, and is continuously wound around the salient pole 40b functioning as the same phase as that of the foregoing salient pole 40b in three-phase driving from the upper side. The leading end of the wound wire (hereinafter, referred to as a "drawn wire") is drawn to the lower side of the salient poles 40b.

Figure 4A:
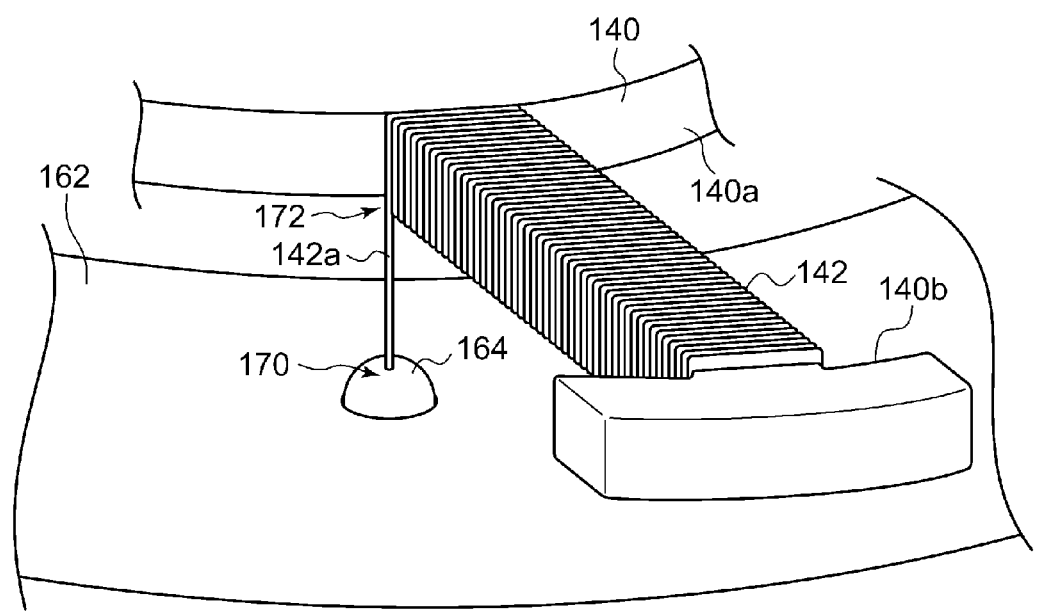
FIG. 4A is a perspective view around a coil as viewed from the top.
Figure 4B:
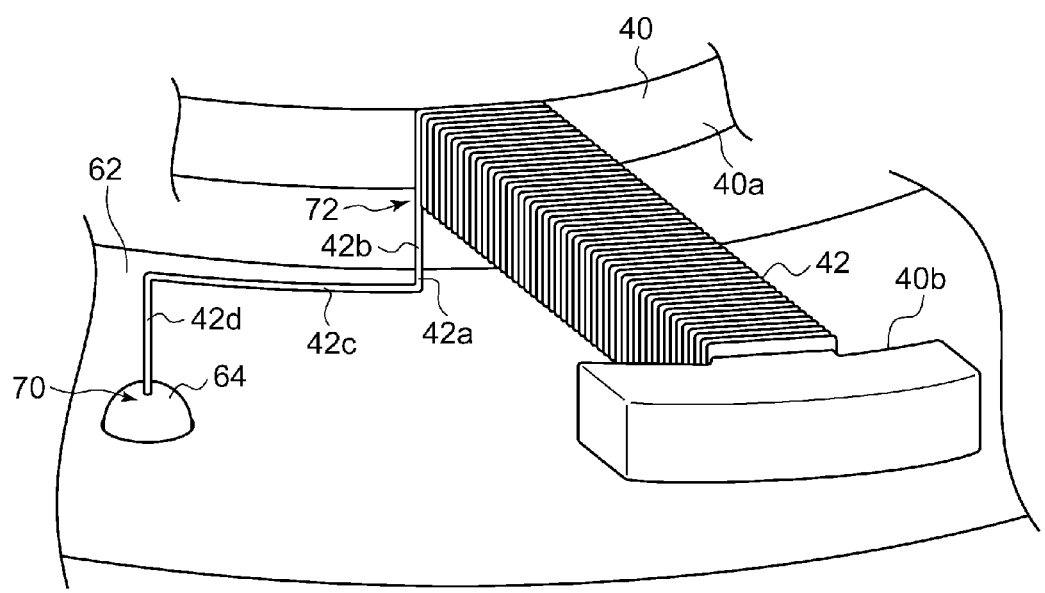
FIG. 4B is a perspective view around a coil as viewed from the top.

FIGS. 4A, 4B are perspective views around the coil as viewed from the top. FIG. 4A is a perspective view around a coil 142 of a comparative example, while FIG. 4B is a perspective view around the coil 42 of this embodiment. According to the coil 142 of the comparative example, a drawn wire 142a is connected with a flexible printed board 162 by a solider 164 at a position right below a drawing position 172 where the drawn wire 142a is drawn from the coil 142, and is fixed to the base 4 (unillustrated in FIG. 4A). That is, a connection position 170 where the drawn wire 142a is connected with the flexible printed board 162 is located right below the drawing position 172. According to this comparative example, the drawn wire 142a has no play, and thus stress is likely to be applied to the drawn wire 142a when the base 4 is deformed.

Conversely, according to the coil 42 of this embodiment, the drawn wire 42a is connected with a flexible printed board (wiring substrate) 62 by a solder 64 at a position avoiding a location right below the drawn position 72 where the drawn wire 42a is drawn from the coil 42, and also avoiding a location right below the coil 42 from which the wire 42a is drawn. That is, the connection position 70 where the drawn wire 42a is connected with the flexible printed board 62 avoids the drawn position 72 and a location right below the coil 42 from which the wire 42a is drawn. When the drawn wire 42a and the flexible printed board are soldered at an outward location relative to the outer circumferences of the salient poles 40b, such a soldering becomes an obstacle to the cylindrical magnet 32 and the mount portion 28b. Hence, it is desirable that the connection position should be located inwardly relative to the outer circumferences of the salient poles 40b.

The drawn wire 42a includes bent portions pre-bent in a cranked shape. Hence, the drawn wire 42a can have a play. More specifically, the drawn wire 42a includes a first base-direction extending portion 42b extending from the lower side of the coil 42 where the wire 42a is drawn, i.e., toward the base 4 (unillustrated in FIG. 4B), a planar-direction extending portion 42c extending from the end of the first base-direction extending portion 42b along the upper face 4d of the base 4, and a second base-direction extending portion 42d extending downwardly from the end of the planar-direction extending portion 42c. As will be explained later with reference to FIG. 7, the second base-direction extending portion 42d is fixed to the base 4 and the flexible printed board.

The bent portions are formed in such a way that the end of the drawn wire 42a is located near a printed board hole 4i (to be discussed later) when the stator core 40 provided with the coils 42 is attached to the base 4 at a predetermined angle. Hence, the end of the drawn wire 42a can be easily inserted in the printed board hole 4i, making the work effective. The longer the planar-direction extending portion 42c is, the more the drawn wire can have a play, and thus stress is not likely to be applied to the drawn wire 42a when the base 4 is deformed. The planar-direction extending portion 42c may be formed longer than the first base-direction extending portion 42b. In addition, at least a part of the bent portion between the planar-direction extending portion 42c and the second base-direction extending portion 42d may be covered with a solder.

Figure 5:
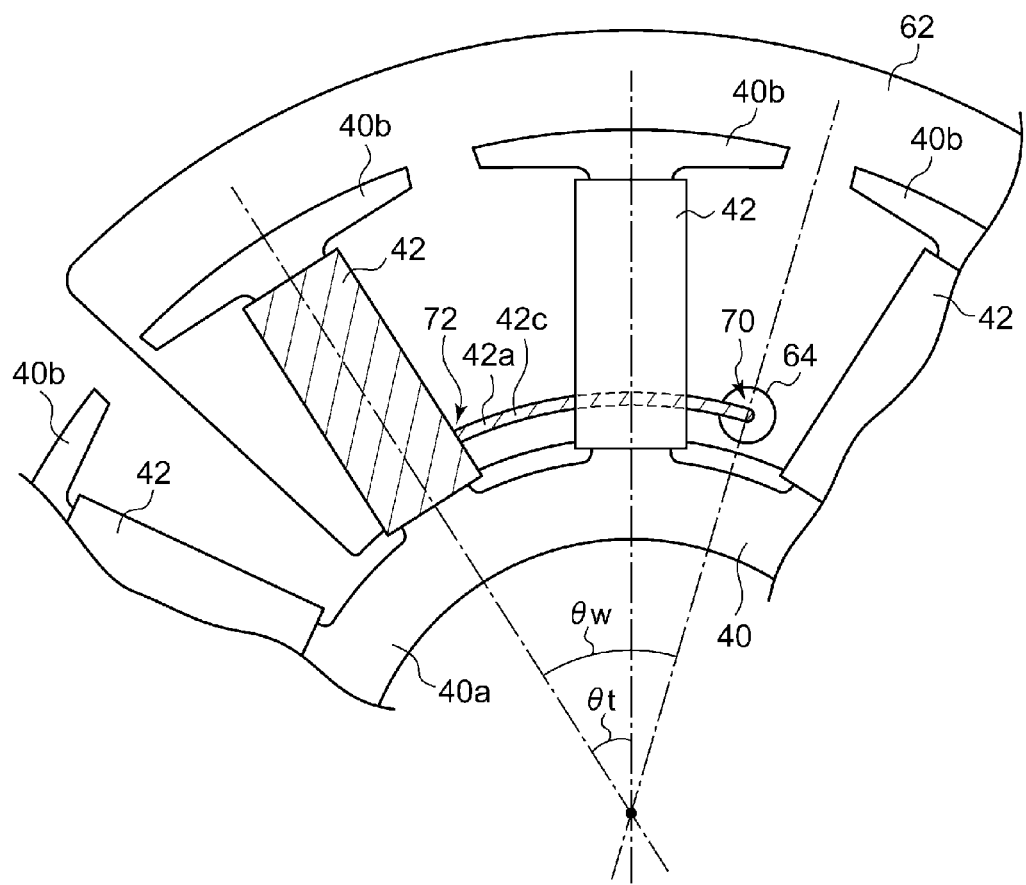
FIG. 5 is an explanatory diagram for a connection position.

FIG. 5 is an explanatory diagram for explaining the connection position in more detail. In FIG. 5, an angle between respective extending directions of the adjoining two salient poles 40b is referred to as a pitch angle $\theta t$. In addition, an angle between the extending direction of the salient pole 40b around which the coil 42 with the drawn wire is wound and a straight line passing through the rotation axis R and the connection position 70 when the stator core 40 is projected on a plane orthogonal to the rotation axis R and passing through the connection position 70 is referred to as a connection position angle $\theta w$. At this time, it is desirable that the rotating device 100 should be constructed so as to satisfy the following formula (1).

[Formula 1]

$$\tfrac{1}{2}\theta t \leq \theta w \leq 3\theta t \qquad (1)$$

In this case, as explained above, the drawn wire 42a can be provided with a play, and the good workability at the time of manufacturing can be accomplished. In this embodiment, the stator core 40 has the nine salient poles, and those are provided at an equal pitch in the circumferential direction. Hence, the salient pole pitch angle $\theta t$ is 40 degrees. Hence, 20 degrees$\leq \theta w \leq$120 degrees can be satisfied. In addition, the connection position 70 is located not right below the coil 42 but between the coil 42 and the adjoining coil 42. This is further desirable in view of the easiness of soldering. Still further, in this embodiment, the connection position 70 is provided at a location where the distances from the drawn position 72 and from the rotation axis R are substantially equal to each other.

Returning to FIG. 3, the base 4 includes an annular wall 4l encircling the stator core 40 and the lower side of the mount portion 28b. The annular wall 4l is formed with the printed board hole 4i that causes the upper face 4d of the base 4 facing with the coils 42 to be in communication with the lower face 4h of the bottom portion 4a facing with the magnetic recording disk 8. The flexible printed board 62 is taken out to the lower-face-4d side from the upper-face-4a side through this printed board hole 4i. A portion of the flexible printed board 62 inserted in the printed board hole 4i is formed so as to come close to the hub 28 in the axial direction toward the external side in the radial direction.

Figure 6A:
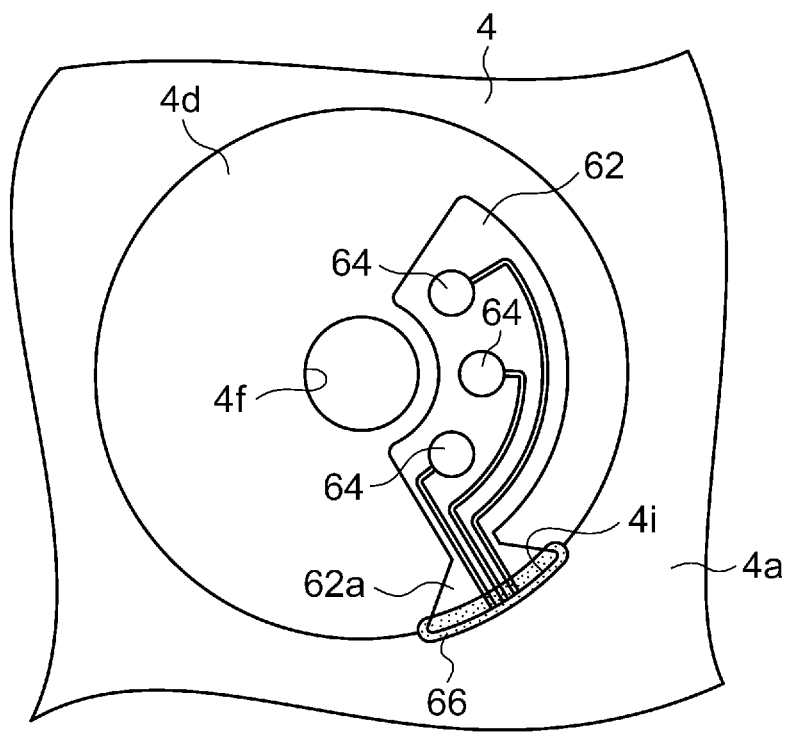
FIG. 6A is a diagram around a flexible printed board.
Figure 6B:
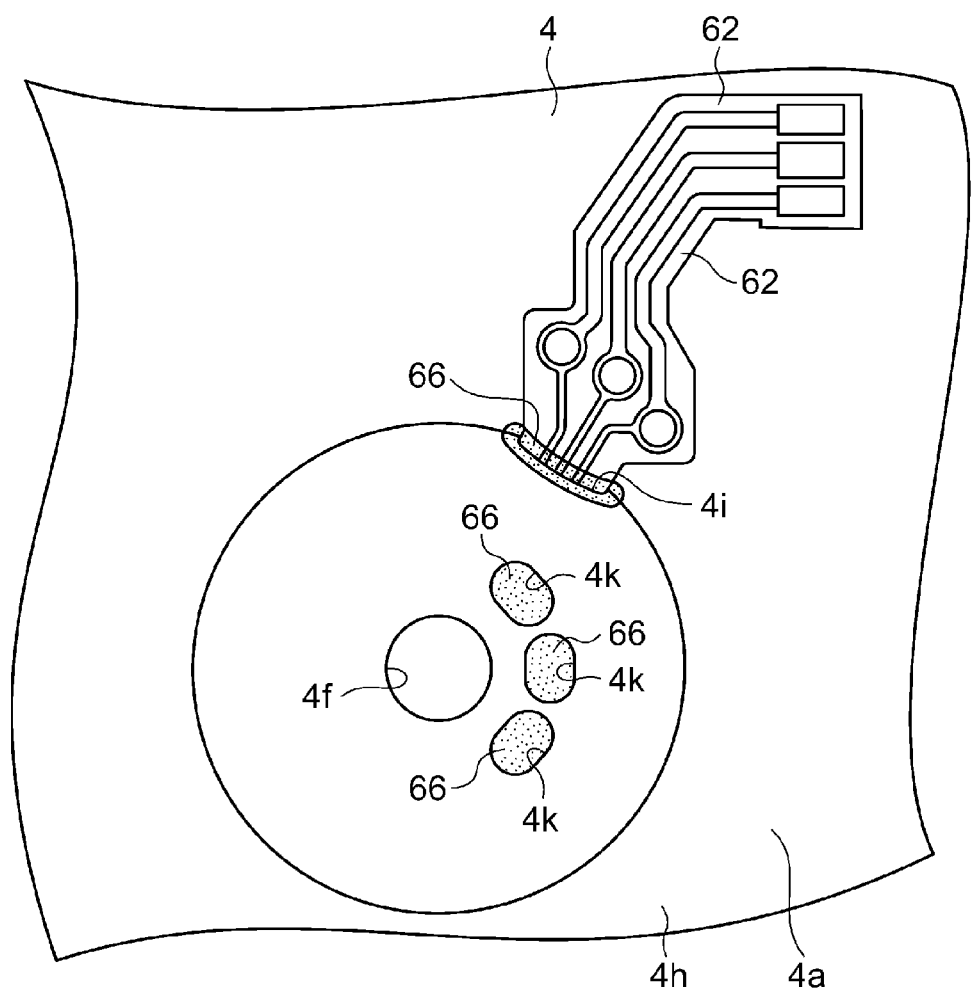
FIG. 6B is a diagram around the flexible printed board.

FIGS. 6A, 6B are diagrams around the flexible printed board. FIG. 6A is a view illustrating the base 4 as viewed from the top, while FIG. 6B is a view illustrating the base 4 as viewed from the bottom. The portion of the flexible printed board 62 inserted in the printed board hole 4i includes a width increasing portion 62a increasing the width in the circumferential direction toward the external side in the radial direction. The width increasing portion 62a is fixed by a bond 66 applied in the printed board hole 4i with at least one of the ends in the widthwise direction contacting the inner circumference of the printed board hole 4i. In this case, the width increasing portion 62a is fixed with both ends contacting the inner circumference of the printed board hole 4i. The bond 66 fixes the width increasing portion 62a, and plugs off the printed board hole 4i. Hence, an entrance of foreign materials into the motor internal space 68 can be suppressed.

Figure 7:
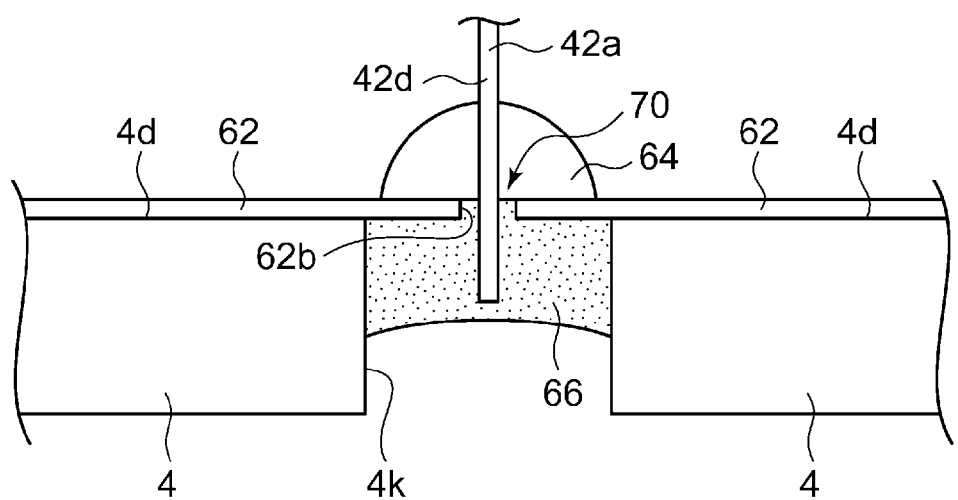
FIG. 7 is an enlarged cross-sectional view around the leading end of a drawn wire of a coil in an enlarged manner.

FIG. 7 is an enlarged cross-sectional view around the leading end of the drawn wire 42a of the coil 42 in an enlarged manner. The second base-direction extending portion 42d of the drawn wire 42a enters a base hole (bottom hole) 4k provided in the base 4 through a board hole (substrate hole) 62b provided in the flexible printed board 62. Note that the base hole 4k is formed larger than the board hole 62b. The second base-direction extending portion 42d is fixed by the bond 66 in a condition entering in the base hole 4k. The bond 66 is applied in the base hole 4k so as to cover the end of the second base-direction extending portion 42d. In addition, the second base-direction extending portion 42d is connected with the flexible printed board 62 by a solder 64. That is, both are electrically connected with each other.

Returning to FIG. 3, the base 4 includes an uplift portion 4e which protrudes upwardly and which encircles the rotation axis R. The uplift portion 4e has the lower face concaved toward the hub 28, and has the upper face protruding toward the hub 28. In other words, the uplift portion 4e has a cross-section formed in a reversed U-shape. The uplift portion 4e includes a sleeve encircling portion 4m encircling the sleeve 44, a holder supporting portion 4n which encircles the sleeve encircling portion 4m, and to which the core holder 46 is fixed, and a joint portion 4p that joins the sleeve encircling portion 4m with the holder supporting portion 4n. The inner circumference of the sleeve encircling portion 4m defines a bearing hole 4f around the rotation axis R.

The core holder 46 is bonded and fixed to the outer circumference of the holder supporting portion 4n together with press-fitting or loose fitting. The core holder 46 is formed in an annular shape. The stator core 40 is bonded and fixed to an outer circumference 46a of the core holder 46 together with press-fitting or loose fitting.

The sleeve 44 is an annular member, is fitted in or engaged with the bearing hole 4f, and is fixed thereto by bonding or press-fitting, etc. The sleeve 44 encircles the shaft 26 with a radial gap 60. The sleeve 44 is formed by cutting and machining the base material like brass. The sleeve 44 may be formed of a ferrous material like SUS 430. An electroless nickel plating may be applied to the surface of the sleeve 44 having undergone cutting and machining. For example, a strike plating may be applied as the undercoat layer of the surface electroless nickel plating. A spreading portion 44a spreading outwardly in the radial direction is formed at the upper-end portion of the sleeve 44. This spreading portion 44a restricts the movement of the rotating body in the axial direction together with the thrust member 30.

The cover 58 is fixed to the lower face of the sleeve 44 by bonding so as to plug off the lower end of the sleeve 44.

The lubricant 48 is applied in gaps between a part of the rotating body including the shaft 26, the hub 28, and the thrust member 30, and, a part of the stationary body including the sleeve 44 and the cover 58. The lubricant 48 contains a fluorescent material. When irradiated with light like ultraviolet rays, the lubricant 48 emits light different from the irradiated light, such as blue or green light by the action of the fluorescent material. Since the lubricant 48 contains the fluorescent material, the liquid level of the lubricant 48 can be easily inspected. In addition, a sticking of the lubricant 48 and a leakage thereof can be easily detected.

A pair of first radial dynamic pressure generating grooves 50 and second radial dynamic pressure generating grooves 52 distant from each other and formed in a herringbone or spiral shape are formed in the inner circumference of the sleeve 44. The first radial dynamic pressure generating grooves 50 are formed above the second radial dynamic pressure generating grooves 52. At least one of the first and second radial dynamic pressure generating grooves 50, 52 may be formed in the outer circumference of the shaft 26 instead of the sleeve 44. When the rotating body rotates, the rotating body is supported in a non-contact manner with the stationary body in the radial direction by the dynamic pressure of the lubricant 48 generated by the first and second radial dynamic pressure generating grooves 50, 52.

Thrust dynamic pressure generating grooves 54 in a herringbone or spiral shape are formed in the upper face of the sleeve 44. The thrust dynamic pressure generating grooves 54 may be formed in the lower face of the hub protrusion 28a instead of the upper face of the sleeve 44. When the rotating body rotates, the rotating body is supported in a non-contact manner with the stationary body in the axial direction by the dynamic pressure of the lubricant 48 generated by the thrust dynamic pressure generating grooves 54.

The sleeve 44 is provided with a communication hole 44b that causes the upper end side of the first radial dynamic pressure generating grooves 50 and the outer circumference side of the thrust dynamic pressure generating grooves 54 to be linearly in communication with the lower end side of the second radial dynamic pressure generating grooves 52. That is, both ends in the radial gap 60 in the axial direction are in communication with each other through the communication hole 44b that is formed separately from the radial gap 60. Hence, the pressures of the lubricant 48 at both ends of the radial gap 60 are balanced, thereby suppressing an occurrence of an excessive pressure difference. As a result, the radial dynamic pressure can be increased at the time of rotation without being restricted by the occurrence of the pressure difference, and thus the rigidity of the bearing can be enhanced.

An explanation will now be given of an operation of the rotating device 100 employing the above-explained structure. In order to rotate the magnetic recording disk 8, three-phase drive currents are supplied to the coils 42 through the flexible printed board 62. When the drive currents flow through the coils 42, magnetic fluxes are produced along the nine salient poles. Such magnetic fluxes apply torque to the cylindrical magnet 32, and thus the hub 28 and the magnetic recording disk 8 engaged therewith are rotated. Simultaneously, the voice coil motor 16 swings the swing arm 14 to move the recording/playing head within the swing range on the magnetic recording disk 8. The recording/playing head converts magnetic data recorded in the magnetic recording disk 8 into electric signals, and transmits the electric signals to an unillustrated control board, or writes data transmitted from the control board in the form of electric signals in the magnetic recording disk 8 as magnetic data.

According to the rotating device 100 of this embodiment, the drawn wire 42a is formed in a cranked shape, and is provided with a play. Hence, although the base 4 is deformed by shock or vibration, stress is not likely to be applied to the drawn wire 42a. Accordingly, even if the base 4 is made thin, the drawn wire 42a is not likely to break. That is, according to the rotating device 100 of this embodiment, further downsizing, thinning, and weight saving of the rotating device 100 are enabled while suppressing a deterioration of the shock resistance and the vibration resistance.

According to the rotating device 100 of this embodiment, the outer circumference wall 4b of the base 4 employs a fold-back structure. Hence, even if the base 4 is made further thin, a deformation like warpage is not likely to occur. As a result, stress is not likely to be applied to the drawn wire 42a, thereby reducing the possibility of the breaking of the drawn wire 42a. In addition, the outer circumference wall 4b includes the circular recess 4j concaved upwardly. Accordingly, the base 4 can be made lightweight by what corresponds to the circular recess 4j. Still further, according to the rotating device 100 of this embodiment, the base 4 includes the uplift portion 4e. When the base 4 includes the outer circumference wall 4b employing the fold-back structure at the external side and the uplift portion 4e at the internal side, a deformation like warpage of the intermediate area, i.e., the area facing the stator core 40 can be prevented further effectively.

The structure of the rotating device according to this embodiment and the operation thereof were explained above. Such an embodiment is merely presented as an example, and a combination of the components of the embodiment described above permits various modifications, and it should be understood for those skilled in the art that such modifications are also within the scope of the present disclosure.

In the embodiment described above, the explanation was given of a so-called outer-rotor type rotating device having the cylindrical magnet 32 located outwardly relative to the stator core 40, but the present disclosure is not limited to this type. For example, the present disclosure is applicable to a so-called inner-rotor type rotating device having the cylindrical magnet located inwardly relative to the stator core.

In the embodiment described above, the explanation was given of an example case in which the stator core 40 has the nine salient poles, but the present disclosure is not limited to this case. For example, the stator core 40 may include six salient poles. In this case, the labor work of forming the coils 42 can be reduced. In addition, the number of salient poles of the stator core 40 may be an integral multiple of three between, for example, 12 to 36. In this case, the number of turns of the coil 42 can be increased.

In the embodiment described above, driving magnetization with 12 polarities is applied to the cylindrical magnet 32, but the present disclosure is not limited to this case. Driving magnetization with even-numbered polarities between, for example, 8 to 16 may be applied to the cylindrical magnet 32. Those descriptions are merely examples, and the number of polarities of driving magnetization is not limited to such a range.

In the embodiment described above, the planar-direction extending portion 42c is formed in, as illustrated in FIG. 5, a circular arc shape, but the present disclosure is not limited to this case. In order to facilitate the labor work, the planar-direction extending portion 42c may be formed in, for example, a bent shape like multiple sides of a polygon, a straight shape, and other shapes as needed.

In the embodiment described above, as illustrated in FIG. 5, the connection portion 70 is provided at a location having substantially same distance from the drawn position 72 and from the rotation axis R, but the present disclosure is not limited to this structure. In order to facilitate the connection, the connection position 70 may be provided at a location further distant from the rotation axis R than the drawn position 72.

The notations in the embodiment, such as SUS 430, SUS 303, and SUS 420 J2, indicate the kind of stainless-steel in the JIS. Those notations are merely examples, and the components formed of SUS 430, SUS 303, and SUS 420 J2 in the embodiment described above may be formed of other metals or a resin material that satisfy the specifications in designing instead of SUS 430, SUS 303, and SUS 420 J2.

In the embodiment described above, as wiring components, the drawn wire 42a (i.e., wiring) is connected with the flexible printed board 62 by soldering, but the present disclosure is not limited to this structure. Other kinds of wiring means, such as a rigid printed board and a connector may be applied as the wiring components. In addition, a composite component formed by coupling multiple wiring means may be applied as the wiring component. Still further, other kinds of connection techniques than soldering, such as welding and bonding, may be applied.

An example bond 66 in the embodiment described above is a thermosetting epoxy-based or acrylic bond. In addition, this bond may be ultraviolet curable making at least the surface cured when irradiated with ultraviolet rays.

What is claimed is:

1. A rotating device comprising:
    a hub including a mount portion on which a recording disk is to be mounted;
    a base including a sheet-metal bottom formed of an aluminum plate or a steel plate, and supporting the hub in a freely rotatable manner through a fluid dynamic bearing;
    a core fixedly supported by the sheet-metal bottom, and including an annular portion and a plurality of salient poles extending from the annular portion;
    coils wound around the plurality of salient poles, respectively; and
    a wiring structure transmitting electric power to the coils, wherein:
    the wiring structure comprises a wiring substrate fixed to the sheet-metal bottom, and a drawn wire from the coil electrically connected with a connection portion of the wiring substrate; and
    the connection portion is provided at a location distant from the coil in a circumferential direction, and the drawn wire includes a loosen portion in an axial direction and in the circumferential direction so as to have a play.

2. The rotating device according to claim 1, wherein:
    when an angle between extending directions of the adjoining two salient poles is θt; and
    when an angle between an extending direction of the salient pole around which the coil with the drawn wire is wound and a straight line passing through the connection portion and a rotation axis of the hub on a plane orthogonal to the rotation axis and passing through the connection portion is θw;
    θw is equal to or greater than ½ of θt and equal to or smaller than three times of θt.

3. The rotating device according to claim 1, wherein the loosen portion includes pre-bent portions.

4. The rotating device according to claim 1, wherein:
    the wiring substrate comprises:
    a first portion fixed on a surface of the sheet-metal bottom at the core side, and provided with the connection portion; and
    a second portion taken out through an opening of the sheet-metal bottom; and
    the first portion and the second portion are formed integrally with each other.

5. The rotating device according to claim 1, wherein the wiring substrate comprises a portion provided in a space in the axial direction between the sheet-metal bottom and the mount portion.

6. The rotating device according to claim 5, wherein the wiring substrate comprises a portion formed in the space so as to come close to the mount portion in the axial direction toward an external side in a radial direction.

7. The rotating device according to claim 1, wherein:
the wiring substrate comprises a portion fixed to a surface of the sheet-metal bottom at the core side, and a substrate hole is formed in an area of the portion corresponding to the connection portion;
a larger bottom hole than the substrate hole is formed in an area of the sheet-metal bottom corresponding to the substrate hole; and
the drawn wire passes completely through the substrate hole, and enters the bottom hole.

8. The rotating device according to claim 7, wherein a bond is applied in the bottom hole so as to cover an end of the drawn wire.

9. The rotating device according to claim 1, wherein the sheet-metal bottom comprises an uplift portion provided at an area inwardly in a radial direction relative to the coils, the uplift portion including a part at the hub side protruding toward the hub.

10. The rotating device according to claim 9, wherein the uplift portion encircles and supports the fluid dynamic bearing.

11. The rotating device according to claim 1, wherein:
the base comprises a circumference wall protruding toward the hub and surrounding the recording disk; and
the circumference wall comprises a circular recess that has a surface of the circumference wall at an opposite side to the hub concaved toward the hub.

12. The rotating device according to claim 1, further comprising an annular core holder which is fixed to the sheet-metal bottom, has an outer circumference to which the annular portion of the core is fixed, is formed separately from the sheet-metal bottom, and is fixed to the sheet-metal bottom.

13. A rotating device comprising:
a hub including a mount portion on which a recording disk is to be mounted;
a base including a sheet-metal bottom formed of an aluminum plate or a steel plate, and supporting the hub in a freely rotatable manner through a fluid dynamic bearing;
a core fixedly supported by the sheet-metal bottom, and including an annular portion and a plurality of salient poles extending from the annular portion;
coils wound around the plurality of salient poles, respectively; and
a wiring structure transmitting electric power to the coils, wherein:
the wiring structure comprises a wiring substrate fixed to the sheet-metal bottom, and a drawn wire from the coil electrically connected with a connection portion of the wiring substrate, the connection portion being provided at a location distant from the coil in a circumferential direction; and
the wiring substrate comprises:
a first portion fixed on a surface of the sheet-metal bottom at the core side, and provided with the connection portion; and
a second portion taken out through an opening of the sheet-metal bottom; and
the first portion and the second portion are formed integrally with each other.

14. The rotating device according to claim 13, wherein the wiring substrate comprises a portion provided in a space in the axial direction between the sheet-metal bottom and the mount portion.

15. The rotating device according to claim 14, wherein the wiring substrate comprises a portion formed in the space so as to come close to the mount portion in the axial direction toward an external side in a radial direction.

16. The rotating device according to claim 13, wherein:
the wiring substrate comprises a portion fixed to a surface of the sheet-metal bottom at the core side, and a substrate hole is formed in an area of the portion corresponding to the connection portion;
a larger bottom hole than the substrate hole is formed in an area of the sheet-metal bottom corresponding to the substrate hole; and
the drawn wire passes completely through the substrate hole, and enters the bottom hole.

17. The rotating device according to claim 16, wherein a bond is applied in the bottom hole so as to cover an end of the drawn wire.

18. The rotating device according to claim 13, wherein
the sheet-metal bottom comprises an uplift portion provided at an area inwardly in a radial direction relative to the coils, the uplift portion including a part at the hub side protruding toward the hub; and
the uplift portion encircles and supports the fluid dynamic bearing.

19. The rotating device according to claim 13, wherein:
the base comprises a circumference wall protruding toward the hub and surrounding the recording disk; and
the circumference wall comprises a circular recess that has a surface of the circumference wall at an opposite side to the hub concaved toward the hub.

20. The rotating device according to claim 13, further comprising an annular core holder which is fixed to the sheet-metal bottom, has an outer circumference to which the annular portion of the core is fixed, is formed separately from the sheet-metal bottom, and is fixed to the sheet-metal bottom.

* * * * *